United States Patent [19]

Ogawa et al.

[11] Patent Number: 5,317,589
[45] Date of Patent: May 31, 1994

[54] LASER OSCILLATOR HAVING A CURVED MIRROR WITH A THROUGH-HOLE

[75] Inventors: Shuji Ogawa; Shigenori Yagi, both of Aichi, Japan

[73] Assignee: Mitsubishi Denki Kabushiki Kaisha, Tokyo, Japan

[21] Appl. No.: 3,725

[22] Filed: Jan. 13, 1993

[30] Foreign Application Priority Data

Jan. 14, 1992 [JP] Japan .................. 4-004770

[51] Int. Cl.⁵ .............................................. H01S 3/08
[52] U.S. Cl. ..................................... 372/99; 372/101; 372/104
[58] Field of Search ............... 372/99, 101, 103, 104, 372/55, 107, 108, 92, 95

[56] References Cited

U.S. PATENT DOCUMENTS

| | | | |
|---|---|---|---|
| 3,839,684 | 10/1974 | Matsuoka et al. | 372/107 |
| 3,969,685 | 7/1976 | Chenausky et al. | 372/95 |
| 4,239,341 | 12/1980 | Cason, III et al. | 372/95 |
| 4,520,486 | 5/1985 | Lavarini | 372/95 |
| 4,580,270 | 4/1986 | Johnson et al. | 372/107 |
| 5,157,684 | 10/1992 | Benda et al. | 372/99 |
| 5,173,916 | 12/1992 | Benda | 372/99 |
| 5,185,760 | 2/1993 | Du et al. | 372/104 |

*Primary Examiner*—John D. Lee
*Assistant Examiner*—Hemang Sanghavi
*Attorney, Agent, or Firm*—Sughrue, Mion, Zinn, Macpeak & Seas

[57] ABSTRACT

A laser oscillator includes a housing which seals a laser medium gas from the atmosphere, concave mirrors (or a set of concave and convex mirrors) positioned in the housing and having the laser medium gas therebetween, an apertured mirror positioned between the concave mirror and the other concave or convex mirror on a line connecting the spherical centers of the mirrors at a predetermined angle relative to the line, and a window through which a laser beam reflected by the apertured mirror is output from the housing. The apertured mirror has a curved reflective surface, thereby simplifying the optical system in the housing and increasing the system's reliability.

20 Claims, 4 Drawing Sheets

LASER OSCILLATOR HAVING A CURVED MIRROR WITH A THROUGH-HOLE

BACKGROUND OF THE INVENTION

The present invention generally relates to a laser oscillator, and more particularly to a resonator used in a laser oscillator.

In a laser oscillator, it is known that the beam diameter must be changed relative to the type of outlet window when a laser beam is reflected from within a housing into the atmosphere. FIG. 6 is a sectional view illustrating the structure of a conventional $CO_2$ gas laser oscillator having a laser beam outlet window 9 made of zinc selenide (ZnSe) material, etc.

In FIG. 6, a housing (e.g., a vacuum chamber) 1 isolates from the atmosphere a laser medium gas 2 energized by discharge energy. A mirror 3 having a reflective surface with a concave shape, and a mirror 4 having a reflective surface with a convex shape, are aligned by a line 5 (e.g., an optical axis) extending through their spherical centers. A partially apertured mirror 6 has a flat reflective surface mounted at an angle of 45 degrees relative to the line 5, and a collimating convex mirror 7 has a convex reflective surface for expanding a laser beam received from the mirror 6. A bend mirror 8 has a flat reflective surface for changing the direction of the laser beam reflected by the convex mirror 7, and a window 9 isolates the laser medium gas 2 from the atmosphere, but allows the laser beam reflected by the bend mirror 8 to exit the housing therethrough.

The operation of the laser oscillator shown in FIG. 6 is described hereinafter. In a $CO_2$ gas laser, a gaseous mixture of $CO_2$, He and $N_2$ is generally sealed in the housing 1 at a negative pressure of several tens of Torr to several hundred Torr. An optical resonator comprising the concave mirror 3, the convex mirror 4 and the apertured mirror 6 is provided enclosing the laser medium gas 2 energized by discharge energy, and the laser beam is reflected and amplified between the concave mirror 3 and the convex mirror 4, passing through the partially apertured mirror 6. The laser beam from the concave mirror which "overflows" the region of the aperture impinges on a mirrored surface external to the aperture of the mirror 6 and is reflected by this reflective surface to the collimating convex mirror 7.

The collimating convex mirror 7 reflects the laser beam, and thereafter the laser beam is expanded and introduced into the window 9 via the bend mirror 8. The window 9 causes at least 99% of the $CO_2$ laser beam to permeate (e.g., exit) therethrough and isolates the laser medium gas from the atmosphere, thereby outputting only the laser beam into the atmosphere.

FIG. 7 is a sectional view illustrating the structure of another conventional system, i.e., a $CO_2$ gas laser oscillator wherein a laser beam outlet window is an aerodynamic or air dam window 90. In FIG. 7, characters identical to those in FIG. 6 designate identical or corresponding elements. Here, a collimating concave mirror 70 having a concave reflective surface condenses the laser beam output from the apertured mirror 6. A bend mirror 80 changes the direction of the laser beam reflected by the mirror 70, and the aerodynamic window 90 passes the laser beam reflected by the bend mirror 80 to the atmosphere. The window 90 has a small hole 91 formed in the center thereof for passing the laser beam. Atmospheric air is prevented from penetrating the housing 1 through the small hole 91 by means of a flow of gas 92 provided through the window in a direction perpendicular to the direction in which the laser beam exits the window. Hence, an air curtain is formed by air flow 92 to prevent atmospheric air from penetrating the housing 1 through the small hole 91.

The operation of the conventional device shown in FIG. 7 is described hereinbelow. The laser beam reflected by the reflective surface of the mirror 6 impinges on the collimating concave mirror 70. The laser beam reflected by the concave mirror 70 is output in a condensed (e.g., narrowed) state to the atmosphere through the small hole 91 in the aerodynamic window 90 via the bend mirror 80. The subsequent operation is similar to that of the device described in FIG. 6 and will not be described.

The known laser oscillator configured as described above requires an optical system having a collimating convex mirror and a bend mirror, when using a window made of zinc selenide (ZnSe) material, etc. for the laser beam to exit or permeate therethrough, to keep the energy density of the laser beam low with respect to the window. Further, when an aerodynamic window is employed, the laser beam must be condensed by the optical system having a collimating concave mirror and a bend mirror so that the laser beam can pass through the small hole formed in the aerodynamic window, thereby increasing the complexity of the optical system and its alignment.

SUMMARY OF THE INVENTION

Accordingly, an object of the present invention is to overcome the disadvantages of the conventional systems by providing a laser oscillator which allows the optical system in the housing to be simplified, the housing to be more compact, and reliability to be increased.

DESCRIPTION OF THE PREFERRED EMBODIMENTS

Figure 1:
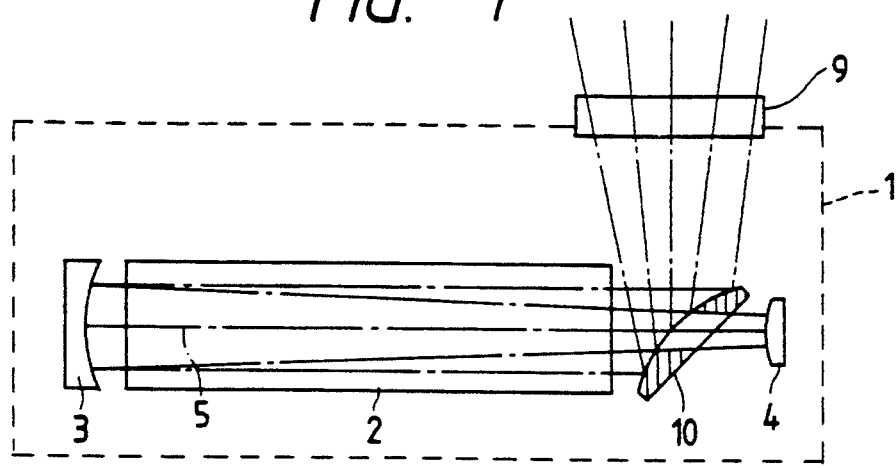
FIG. 1 is a sectional view illustrating the structure of a laser oscillator according to an embodiment of the present invention.
Figure 6:
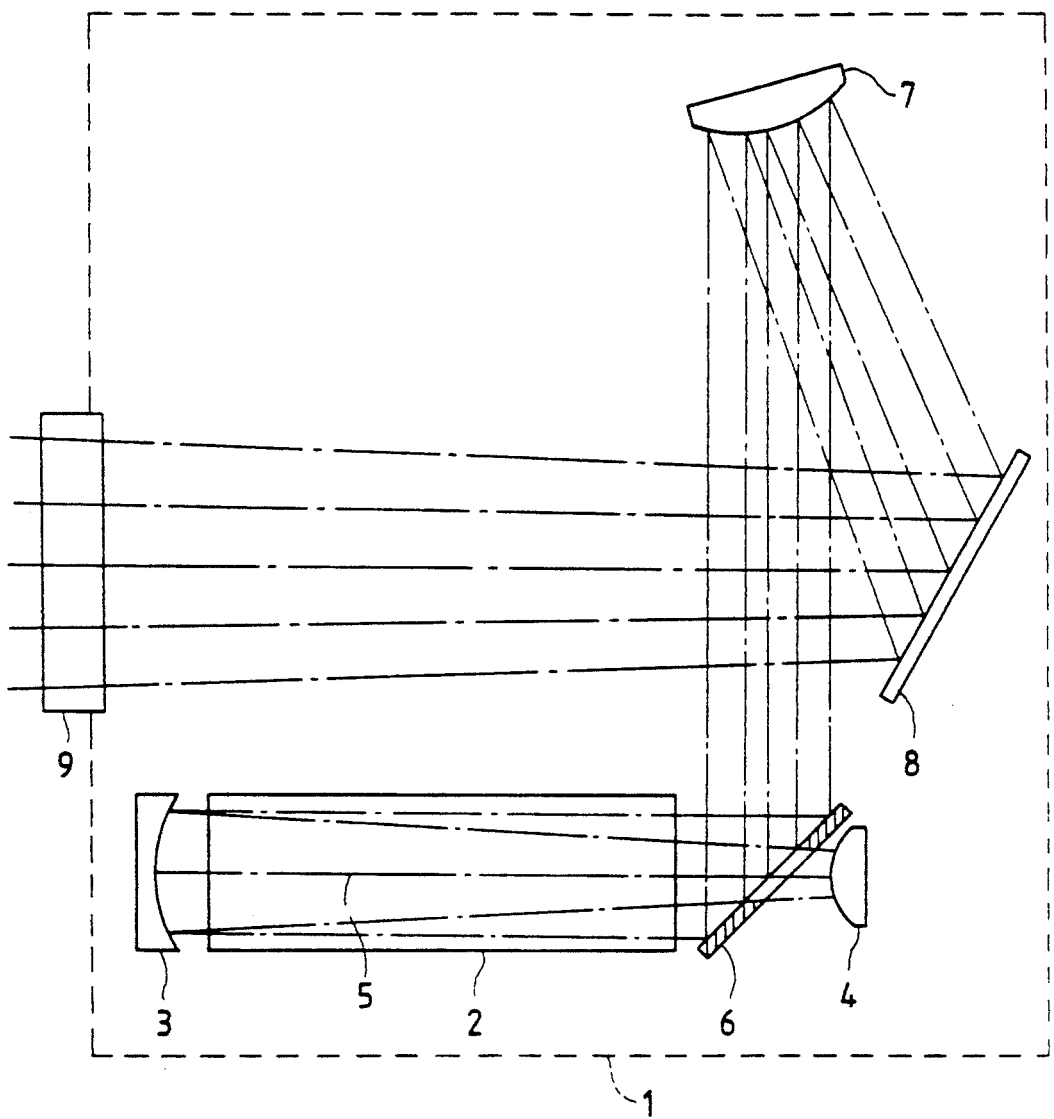
FIG. 6 is a sectional view illustrating the structure of a conventional laser oscillator.

A first embodiment of the present invention is described hereinbelow with reference to the appended drawings. Referring initially to FIG. 1, an apertured mirror 10 having a convex reflective surface is provided at an angle of 45 degrees relative to a line (e.g., an optical axis) 5 connecting the spherical centers of a concave mirror 3 and a convex mirror 4. The other elements of the system will not be described since they are indicated by identical reference numerals in FIG. 6 described above.

The operation of the first embodiment shown in FIG. 1 is described hereinbelow. A laser beam reflected by the apertured mirror 10 having a convex reflective surface is expanded and output as a laser beam into the atmosphere via the window 9 made of zinc selenide (ZnSe) material. Since the laser beam is expanded at the position of the window 9, the energy density of the laser beam with respect to the window 9 is kept low, thereby stabilizing the laser beam.

Figure 2:
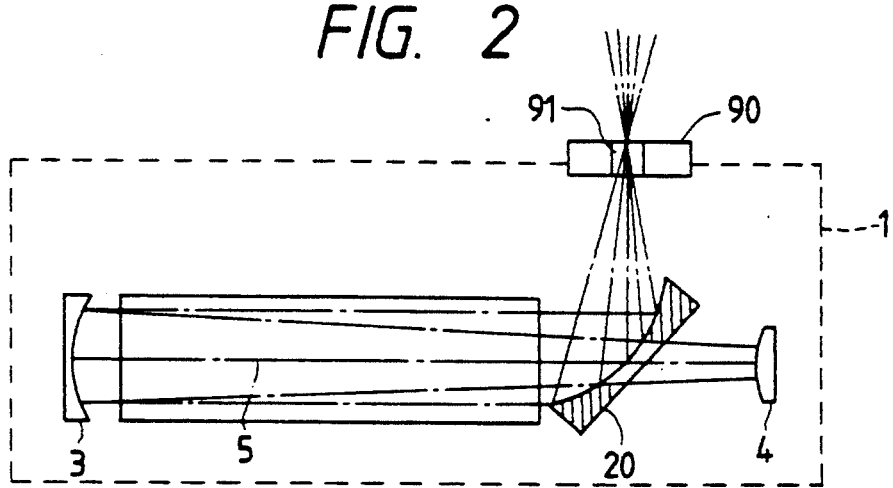
FIG. 2 is a sectional view illustrating the structure of a laser oscillator according to a second embodiment of the present invention.
Figure 7:
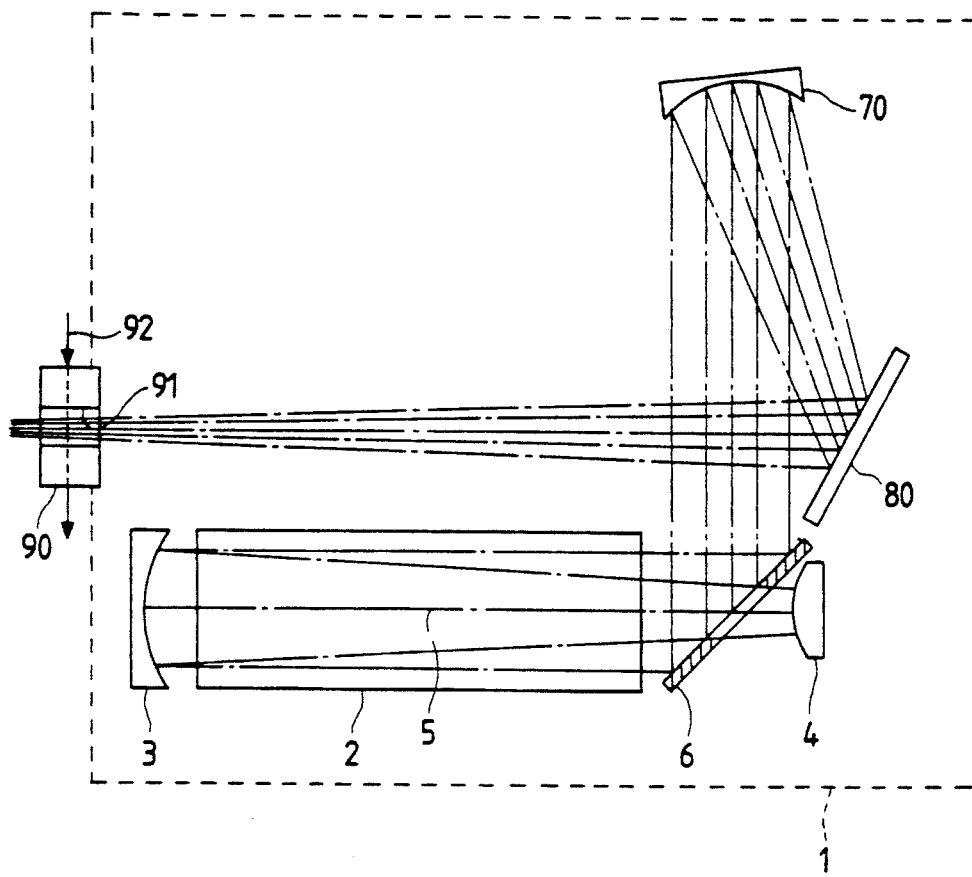
FIG. 7 is a sectional view illustrating the structure of another conventional laser oscillator.

FIG. 2 illustrates a second embodiment of the present invention, wherein an apertured mirror 20 has a concave reflective surface formed at an angle of 45 degrees relative to an optical axis 5 connecting the spherical centers of the concave mirror 3 and the convex mirror 4. The description of the other components shown in FIG. 2 is omitted because they are identical to those shown in FIG. 7 illustrating the second conventional system.

The operation of the embodiment shown in FIG. 2 is described hereinbelow. A laser beam reflected by the apertured mirror 20 of concave curvature is condensed at the position of aerodynamic window 90 having a small hole 91 through which the laser beam is output to the atmosphere.

Since the laser oscillator in the first (or second) embodiment shown in FIG. 1 (or FIG. 2) includes an apertured mirror 10 (or 20) having a convex (or concave) reflective surface arranged on the line 5 connecting the spherical centers of the concave mirror 3 and the convex mirror 4 at an angle of 45 degrees relative to the line 5, the laser beam has an elliptical shape with spherical aberration, resulting in a laser beam having a poor condensing performance. This disadvantage has been eliminated from laser oscillators built according to the embodiments of the invention illustrated in FIGS. 3-5 and described below.

Figure 3:
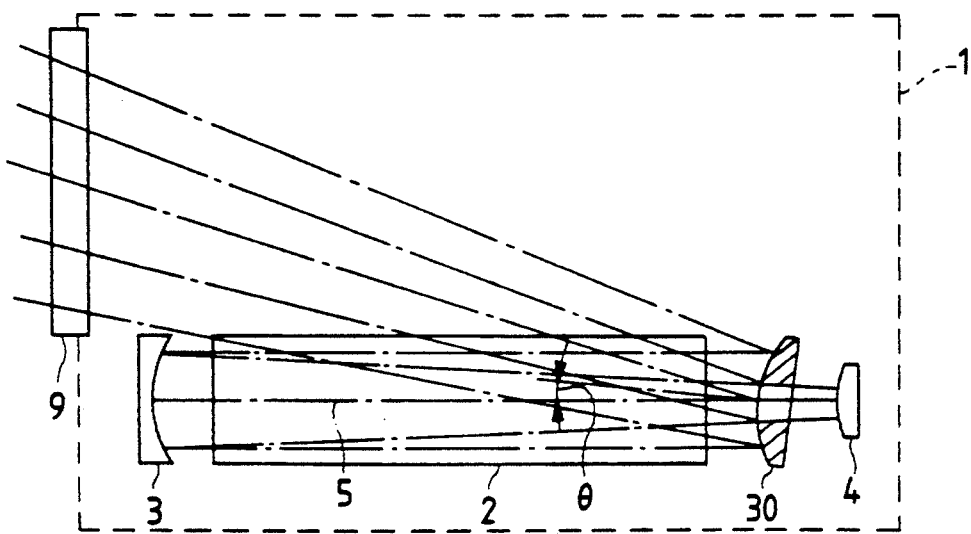
FIG. 3 is a sectional view illustrating the structure of a laser oscillator according to a third embodiment of the present invention.

FIG. 3 illustrates a third embodiment of the present invention, wherein apertured mirror 30 has a convex reflective surface on a line 5 connecting the spherical centers of the concave mirror 3 and the convex mirror 4, at an angle of less than 45 degrees, and preferably not more than 10 degrees, relative to the line 5. By setting the angle of the reflective surface relative to the line 5 to 10 degrees or less, spherical aberration can be reduced and the beam diameter can be changed. Naturally, as the angle approaches zero degrees, i.e., vertical incidence, the spherical aberration decreases. The operation of the embodiment shown in FIG. 3 is similar to those shown in FIGS. 1-2 and will not be described.

Figure 4:
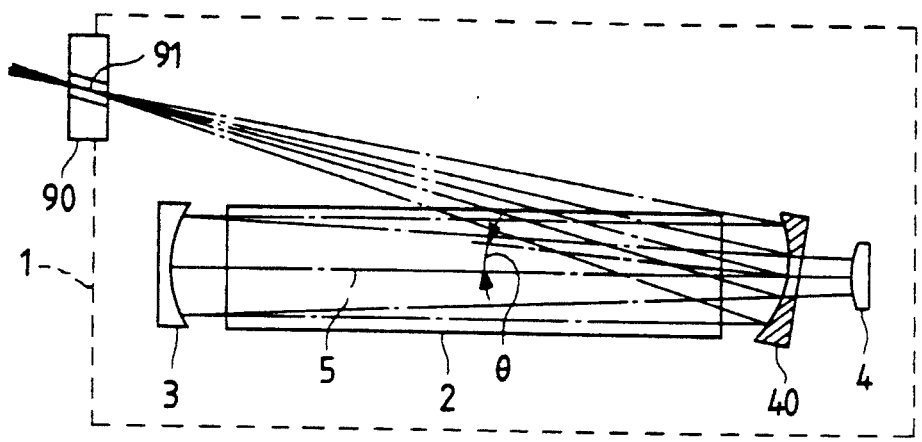
FIG. 4 is a sectional view illustrating the structure of a laser oscillator according to a fourth embodiment of the present invention.

FIG. 4 illustrates a fourth embodiment of the present invention, wherein an apertured mirror 50 has a concave reflective surface for condensing a beam through the aperture of an air dam. The structure and operation of the fourth embodiment will not be otherwise described since they are identical to those of the third embodiment shown in FIG. 3.

Figure 5:
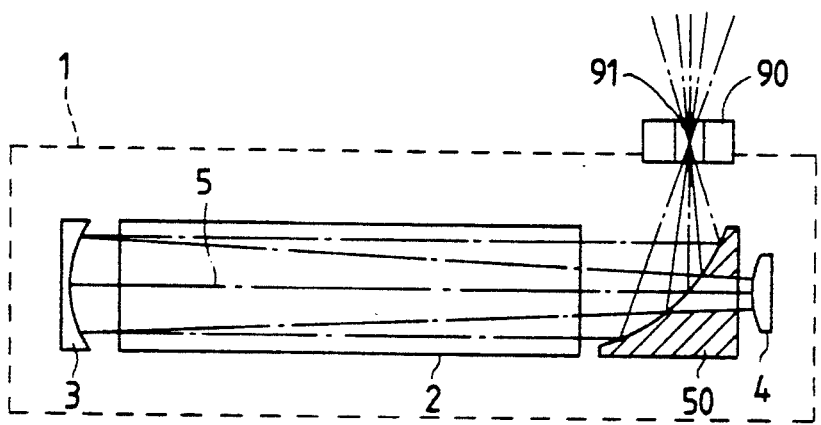
FIG. 5 is a sectional view illustrating the structure of a laser oscillator according to a fifth embodiment of the present invention.

FIG. 5 illustrates a fifth embodiment of the present invention, wherein an apertured mirror 50 has a concave reflective surface on a line 5 connecting the spherical centers of the concave mirror 3 and the convex mirror 4 so that an angle of incidence of the laser beam is 45 degrees. However, since the reflective surface is paraboloidal, the laser beam output through the small hole 91 of the aerodynamic window 90 into the atmosphere is an approximately circular laser beam with reduced spherical aberration. The other elements and operation of the fifth embodiment are similar to those of the embodiments shown in FIG. 2 and FIG. 4 and will not be described.

In the fifth embodiment shown in FIG. 5, a mirror 50 having a concave, paraboloidal reflective surface is used with the aerodynamic window 90. An identical effect will be produced by the combination of an apertured mirror having a convex, paraboloidal reflective surface and a window made of zinc selenide (ZnSe material), etc. which allows the laser beam to exit.

Further, in the embodiment of FIG. 5, the laser beam enters at an incident angle of 45 degrees into the through mirror 50 having a concave, paraboloidal reflective surface. This embodiment may be configured at an incident angle of less than 45 degrees, i.e., as in the embodiments shown in FIGS. 3-4, thereby reducing the spherical aberration and providing a laser beam superior in condensing performance.

Figure 8:
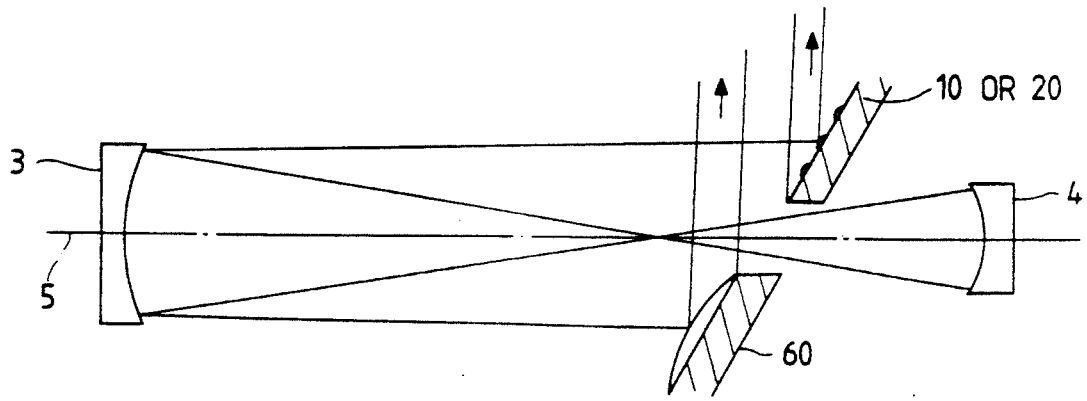
FIG. 8 is a sectional view of a sixth embodiment of the invention.

FIG. 8 illustrates another embodiment of the invention, where the same functions and effects as described in the preceding embodiments can be obtained through the use of a slightly different optical system. In FIG. 8 the mirror 3 is concave as in the previous embodiments but, mirror 4 is provided in concave form, such that the path of the light rays is as illustrated therein. This configuration is referred to as a "negative branch" design. Although the mirror 60 is illustrated as being flat in FIG. 8, it may take the form of any of the mirrors illustrated in FIGS. 1-5 to like effect. It may also be tilted off-axis as in the embodiments of FIGS. 3 and 4. The operation of this design follows readily from the preceding discussion and need not be discussed in detail.

The present invention is not limited to the $CO_2$ gas oscillators illustrated by way of example in the first to sixth embodiments of the invention, but also is applicable to other gas laser oscillators. The invention may be embodied in other specific forms without departing from the spirit or essential characteristics thereof. Thus, while certain preferred embodiments have been shown and described, many changes and modifications within the spirit of the invention will be apparent to those of working skill in this technical field. Thus, the scope of the invention should be considered as limited only by the appended claims.

It will be apparent that the invention, as described above, will provide a low-process, compact laser oscillator having a simple configuration because of the convex or concave reflective surface of the through mirror which can expand or condense the laser beam, respectively. Further, the laser oscillators according to the present invention minimize the number of mirrors as compared with the conventional laser oscillators, thereby reducing laser beam loss at the mirrors.

What is claimed is:

1. A laser oscillator, comprising:
   a housing including a laser medium gas therein such that said laser medium gas is isolated from the atmosphere;
   first and second curved mirrors positioned in said housing and having said laser medium gas positioned therebetween;
   an apertured mirror positioned between said first and second mirrors on a line connecting spherical centers of said first and second mirrors at an angle of less than 45° relative to said line, said apertured mirror having a curved reflective surface; and a window formed in said housing through which a laser beam reflected by said apertured mirror is output from said housing.

2. A laser oscillator according to claim 1, wherein the reflective surface of the apertured mirror is convex.

3. A laser oscillator according to claim 2, wherein said window comprises zinc selenide.

4. A laser oscillator according to claim 1, wherein the reflective surface of the apertured mirror is concave.

5. A laser oscillator according to claim 4, wherein the window comprises an aerodynamic window.

6. A laser oscillator according to claim 1, wherein the reflective surface of the apertured mirror is paraboloidal.

7. A laser oscillator according to claim 1, wherein the apertured mirror provided on said line connecting the spherical centers of the first and second mirrors is provided at an angle of no more than 10 degrees relative to said line.

8. A laser oscillator according to claim 1, wherein the reflective surface of the apertured mirror has a concave, spherical shape.

9. A laser oscillator according to claim 1, wherein the reflective surface of the apertured mirror has a concave, paraboloidal shape.

10. A laser oscillator according to claim 1, wherein said laser medium gas comprises $CO_2$ gas.

11. A laser oscillator according to claim 1, wherein said first and second mirrors are each concave.

12. A laser oscillator according to claim 11, wherein the reflective surface of the apertured mirror is convex.

13. A laser oscillator according to claim 11, wherein the reflective surface of the apertured mirror is concave.

14. A laser oscillator according to claim 11, wherein the reflective surface of the apertured mirror is paraboloidal.

15. A laser oscillator according to claim 1, wherein one of said first and second mirrors is convex and another of said first mirrors is concave.

16. A method of generating and directing a laser beam, comprising:
    providing a housing containing a laser medium gas such that said laser medium gas is isolated from the atmosphere;
    positioning a concave mirror and a convex mirror in said housing such that said laser medium gas is positioned therebetween;
    positioning an apertured mirror between said concave mirror and said convex mirror on a line connecting spherical centers of said concave mirror and said convex mirror at an angle of less than 45° relative to said line;
    generating a laser beam within said housing;
    reflecting said laser beam with said apertured mirror; and
    providing a window in said housing through which said laser beam reflected by said apertured mirror is output form said housing, the reflective surface of said apertured mirror having a curvature.

17. A method according to claim 16, further comprising providing the apertured mirror with a convex reflective surface.

18. A method according to claim 16, further comprising providing the apertured mirror with a concave reflective surface.

19. A method according to claim 16, further comprising providing the apertured mirror with a paraboloidal reflective surface.

20. A method according to claim 16, wherein said step of positioning said apertured mirror on said line connecting the spherical centers of the concave mirror and the convex mirror includes inclining said apertured mirror at an angle of no more than 10 degrees relative to said line.

* * * * *